(12) United States Patent
Noda

(10) Patent No.: US 10,545,228 B2
(45) Date of Patent: Jan. 28, 2020

(54) OBJECT IDENTIFICATION DEVICE

(71) Applicant: Mitsubishi Electric Corporation, Tokyo (JP)

(72) Inventor: Shinsaku Noda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 696 days.

(21) Appl. No.: 14/853,178

(22) Filed: Sep. 14, 2015

(65) Prior Publication Data

US 2016/0349358 A1   Dec. 1, 2016

(30) Foreign Application Priority Data

May 29, 2015   (JP) ................................. 2015-109460

(51) Int. Cl.
*G01S 13/86* (2006.01)
*G01S 7/41* (2006.01)
*G01S 13/93* (2006.01)
*G01S 13/10* (2006.01)
*G08G 1/017* (2006.01)

(52) U.S. Cl.
CPC ............ *G01S 13/867* (2013.01); *G01S 7/412* (2013.01); *G01S 13/10* (2013.01); *G01S 13/865* (2013.01); *G01S 13/931* (2013.01); *G06T 2207/30261* (2013.01); *G08G 1/017* (2013.01)

(58) Field of Classification Search
CPC ............ G01S 13/86–874; G01S 7/412; G01S 13/931; G01S 13/865; G01S 13/10; G01S 17/023; G06K 9/00624–00832; G06K 2209/21; G08G 1/017–056; G06T 2207/30236; G06T 2207/30261
See application file for complete search history.

(56) References Cited

U.S. PATENT DOCUMENTS 7,293,400 B2 * 11/2007 Taware .................... G05B 9/02
                                                                60/39.27
7,471,234 B1 * 12/2008 Lang ....................... G01S 7/064
                                                                342/26 R
(Continued)

FOREIGN PATENT DOCUMENTS

JP   2007-255977 A   10/2007
JP   2009-237898 A   10/2009
(Continued)

OTHER PUBLICATIONS

Communication dated Mar. 22, 2016 from the Japanese Patent Office in counterpart application No. 2015-109460.
(Continued)

*Primary Examiner* — Matthew M Barker
(74) *Attorney, Agent, or Firm* — Sughrue Mion, PLLC; Richard C. Turner

(57) ABSTRACT

An object identification device that can accurately identify a detected object is obtained. A radar inputs a radar confidence for an object in each of categories to a CPU; a camera inputs a camera confidence for an object in each of categories to the CPU; the CPU weighted-averages the respective confidences of the radar and the camera for each category so as to obtain the average confidence of each category; then, the category having a highest average confidence is identified as the kind of the object.

12 Claims, 2 Drawing Sheets

(56) References Cited

U.S. PATENT DOCUMENTS

| | | | |
|---|---|---|---|
| 7,529,411 B2* | 5/2009 | Haupt | G06K 9/00288 382/118 |
| 8,803,975 B2* | 8/2014 | Haupt | G06K 9/00288 348/161 |
| 9,052,393 B2* | 6/2015 | Kriel | G01S 13/867 |
| 9,310,804 B1* | 4/2016 | Ferguson | B60W 40/00 |
| 9,889,858 B2* | 2/2018 | Schmudderich | B60W 50/0097 |
| 2005/0207622 A1* | 9/2005 | Haupt | G06K 9/00288 382/118 |
| 2006/0074496 A1* | 4/2006 | Taware | G05B 9/02 700/11 |
| 2007/0225933 A1 | 9/2007 | Shimomura | |
| 2009/0222776 A1* | 9/2009 | Meers | G05B 9/02 716/106 |
| 2012/0076417 A1 | 3/2012 | Yoshii et al. | |
| 2014/0205139 A1* | 7/2014 | Kriel | G06K 9/00805 382/103 |
| 2014/0211985 A1* | 7/2014 | Polese | G06K 9/00362 382/103 |
| 2015/0112570 A1* | 4/2015 | Schmudderich | B60W 40/04 701/93 |
| 2015/0112571 A1* | 4/2015 | Schmudderich | B60W 30/08 701/93 |

FOREIGN PATENT DOCUMENTS

| | | |
|---|---|---|
| JP | 201122991 A | 2/2011 |
| JP | 201248643 A | 3/2012 |
| JP | 201364671 A | 4/2013 |

OTHER PUBLICATIONS

Communication dated Sep. 13, 2016, from the Japanese Patent Office in counterpart application No. 2015-109460.

* cited by examiner

| | CONFIDENCE | | | WEIGHT |
|---|---|---|---|---|
| | AUTOMOBILE | MOTORCYCLE | PEDESTRIAN | |
| RADAR | 0.12 | 0.62 | 0.26 | 0.2 |
| CAMERA | 0 | 0.35 | 0.65 | 0.8 |
| WEIGHTED AVERAGE | 0.024 | 0.404 | 0.572 | |

OBJECT IDENTIFICATION DEVICE

BACKGROUND OF THE INVENTION

Field of the Invention

The present invention relates to an object identifying device that identifies an object by use of object identification information from a plurality of sensors.

Description of the Related Art

As a conventional object identification device, for example, an device utilizing a technology disclosed in Patent Document 1 is known. In an object identification device utilizing the conventional technology, at first, a laser radar detects an object. In the case where the detected object is situated at a position that exceeds the pedestrian detectable region of the laser radar, identification information indicating that the object is not a pedestrian is attached to the object and then the object is sent to a camera. Next, in the camera, the object, among detected objects, to which the identification information has been attached is removed from the identification subjects; then, image identification processing such as pattern matching is applied to the remaining objects so that identification of a pedestrian is performed.

[Patent Document 1] Japanese Patent Application Laid-Open No. 2009-237898

In a conventional object identification device configured in such a manner as described above, there has been a problem that for example, in the case where due to fluctuation of a reflection level, a pedestrian who is at a position that exceeds the pedestrian detectable region is detected by a laser radar, it is determined that he is not a pedestrian and hence accurate identification is not performed.

SUMMARY OF THE INVENTION

The present invention has been implemented taking the foregoing problem into consideration; the objective thereof is to obtain an object identification device that can accurately identify a detected object.

An object identification device according to the present invention includes a plurality of sensors that each output a confidence indicating a degree of matching with a category preliminarily determined for the kind of a detected object and a processing unit that obtains an average confidence for each of the categories by averaging the confidences of the sensors and then identifies the category having a highest average confidence as the kind of the object.

In the present invention, the results of identifications by a plurality of sensors are determined by use of a confidence; therefore, an object can accurately be identified.

The foregoing and other object, features, aspects, and advantages of the present invention will become more apparent from the following detailed description of the present invention when taken in conjunction with the accompanying drawings.

DETAILED DESCRIPTION OF THE INVENTION

Embodiment 1

Figure 1:
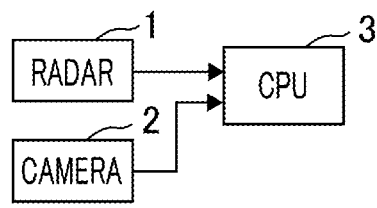
FIG. 1 is a block diagram representing the configuration of an object identification device according to Embodiment 1 of the present invention.

FIG. 1 represents an object identification device according to Embodiment 1 of the present invention. In Embodiment 1, the object identification device is provided with a radar 1 and a camera 2, as sensors for detecting an object; the respective detection results are inputted to a CPU (Central Processing Unit) (referred to also as a processing unit) 3 as a processing unit. The object identification device is mounted in an automobile or the like, detects an object existing ahead, and identifies the kind of the object.

Embodiment 1 provides an object identification device that identifies detected objects and categorizes them into three categories, i.e., "automobile", "motorcycle", and "pedestrian".

At first, the configuration and the operation of the radar 1 will be explained. The radar 1 transmits an electric wave (transmission pulse), which is controlled in such a way as to be a pulse, and the electric wave reflected on an object (unillustrated) is received, as a reception pulse, by the radar 1. The time difference between the reception pulse and the transmission pulse, i.e., a time T taken at a time when the electric wave shuttles between the object identification device and the object (the distance between them is designated by "R") is measured by use of a counter; then, the distance R is calculated through the equation (1). In the equation (1), "c" is the light velocity.

$$R = \frac{cT}{2} \quad (1)$$

In this situation, the method in which the radar 1 identifies the object will be explained. It is widely known that a reception level A of the electric wave that is transmitted from the radar 1, reflected on the object, and then is received by the radar 1 is gradually attenuated in accordance with the distance R to the object. Because the reflectance of an electric wave differs depending on an object, the reception level A for an automobile, which has the largest reflectance among the respective reflectance values of the foregoing three categories, is the highest; the reception level A for a motorcycle is the second highest; the reception level A for a pedestrian, which has the smallest reflectance, is the lowest.

Figure 2:
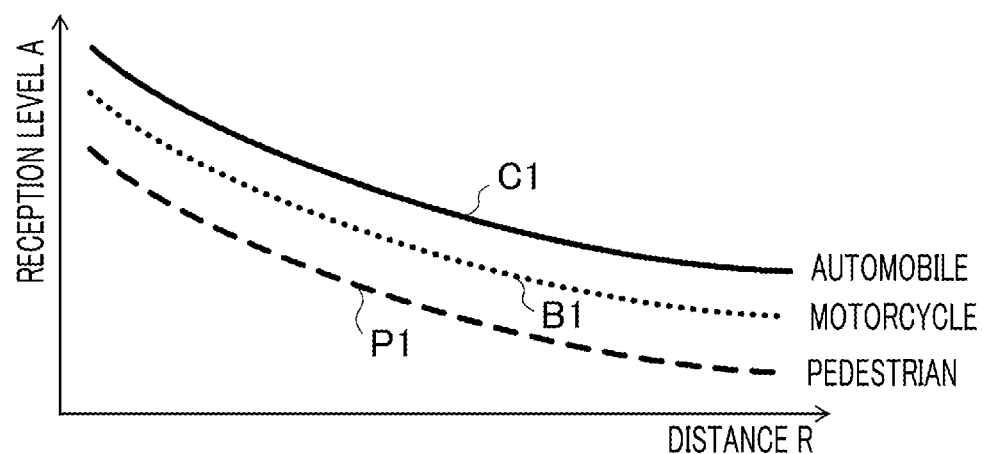
FIG. 2 is a graph representing examples of the characteristics of the reception levels of a radar in the object identification device according to Embodiment 1 of the present invention.

FIG. 2 symbolically represents the behaviors of the respective reception levels A. The reception level A for an automobile changes as represented by a thick solid line C1; the reception level A for a motorcycle changes as represented by a dotted line B1; the reception level A for a pedestrian changes as represented by a thick broken line P1.

Therefore, when the relationship among the category of an object, the distance R, and the reception level A at a time when the radar 1 is utilized is preliminarily comprehended in an experimental manner, the category of a detected object can be identified based on the distance R to the object and the reception level A.

However, because the reflectance of an automobile, even though it is included in the same category of an automobile, differs depending on the type or the direction of the automobile, the actual reception level A changes; in addition, the actual reception level A changes due to various contributing factors such as weather and noise. Accordingly, the actual reception level A for each of the categories of the object is not a single value but a value distributing in a certain range.

Figure 3:
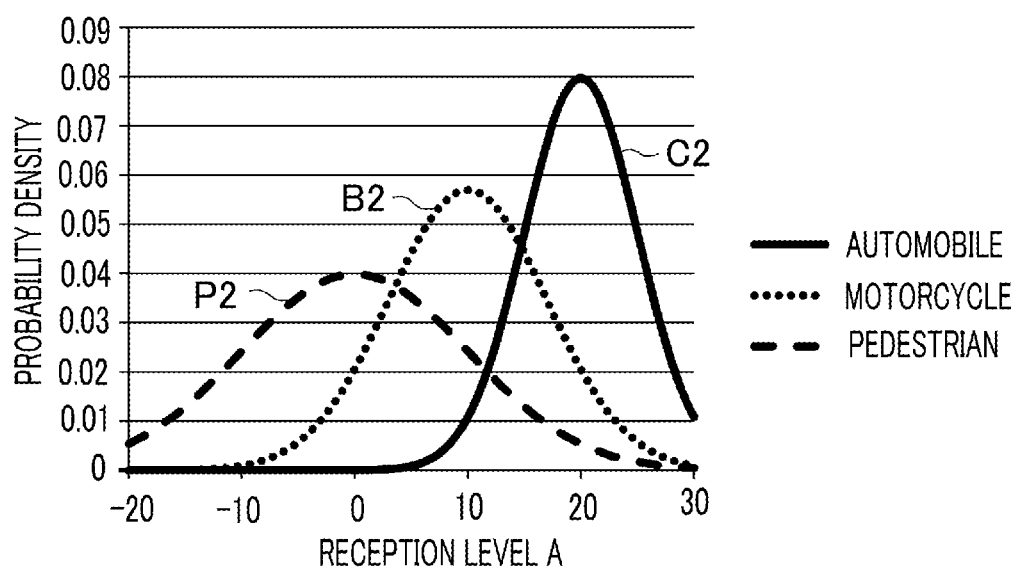
FIG. 3 is a graph representing the characteristics of the reception-level distribution of each detection-object category.

Taking the foregoing fact into consideration, FIG. 3 represents the distribution of the reception level A, as the probability density, at a time when the distance R to the object is determined. The probability density for an automobile is represented by a thick solid line C2; the probability density for a motorcycle is represented by a dotted line B2; the probability density for a pedestrian is represented by a thick broken line P2.

Figures 4, 5:
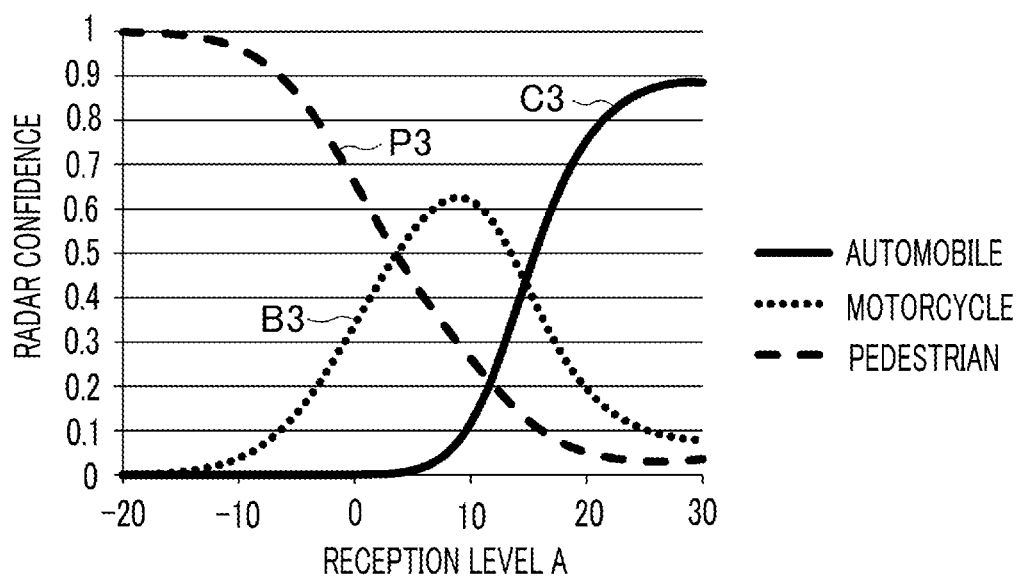
FIG. 4 is an explanatory graph representing the radar confidence vs. reception level characteristics for each detection-object category.
FIG. 5 is an explanatory table representing examples of weighted averages obtained by a CPU in the object identification device according to Embodiment 1 of the present invention.

The respective radar confidences for the categories vs. the reception level A is calculated and is represented by a chart in FIG. 4 in which the respective probability densities in FIG. 3 are normalized in such a way that the summation thereof becomes "1" with respect to each of the reception levels A. The radar confidence for an automobile is represented by a thick solid line C3; the radar confidence for a motorcycle is represented by a dotted line B3; the radar confidence for a pedestrian is represented by a thick broken line P3. For example, when the reception level A is 10, the radar confidence for the category "automobile" is 0.12, the radar confidence for the category "motorcycle" is 0.62, and the radar confidence for the category "pedestrian" is 0.26.

The radar confidence for each of the categories of the objects, calculated as described above, is inputted from the radar 1 to the CPU 3, which is a processing unit.

In Embodiment 1, the radar 1 calculates the radar confidence for each category, based on the distance R and the reception level A; however, it may be allowed that the radar 1 calculates the radar confidence by use of a characteristic quantity other than the distance R and the reception level A.

Next, the configuration and the operation of the camera 2 will be explained. At first, pattern matching for an automobile is applied to an image obtained through the image-capturing device (unillustrated) of the camera 2; in the case where an object having a matching degree of a predetermined value or larger is detected, the matching degree is stored as a matching degree for the category "automobile". In the case where no object having a matching degree of the predetermined value or larger is detected, the matching degree of the category "automobile" is set to 0%.

Then, as is the case with the foregoing pattern matching for an automobile, pattern matching for a motorcycle is implemented; in the case where an object having a matching degree of a predetermined value or larger is detected, the matching degree is stored as a matching degree for the category "motorcycle". In the case where no object having a matching degree of the predetermined value or larger is detected, the matching degree of the category "motorcycle" is set to 0%.

Furthermore, pattern matching for a pedestrian is implemented; in the case where an object having a matching degree of a predetermined value or larger is detected, the matching degree is stored as a matching degree for the category "pedestrian". In the case where no object having a matching degree of the predetermined value or larger is detected, the matching degree of the category "pedestrian" is set to 0%.

There will be explained a method of obtaining the camera confidence for each category, based on the matching degree for each category acquired in such a manner as described above. The camera confidence for each category is obtained by normalizing the respective matching degrees for the categories in such a way that the summation of them becomes "1". For example, in the case where the matching degree for the category "automobile" is 0%, the matching degree for the category "motorcycle" is 42%, and the matching degree for the category "pedestrian" is 78%, the camera confidence for the category "automobile" is 0, the camera confidence for the category "motorcycle" is 0.35, and the camera confidence for the category "pedestrian" is 0.65.

The camera confidence for each of the categories of the objects, calculated as described above, is inputted from the camera 2 to the CPU 3, which is a processing unit.

Next, there will be explained a method of identifying an object, based on the radar confidence and the camera confidence for each category, which are inputted to the CPU 3 in such a manner as described above. In Embodiment 1, as the sensors, the radar 1 and the camera 2 are utilized and the confidences thereof for each category are obtained; however, the sensors have different aptitudes for identifying an object. That is to say, although in the case of the radar 1, the confidence for each category is obtained based on the reception level A, the identification of an object based only on the reception level A may not provide a high authenticity. In contrast, in the case of the camera 2, the identification is implemented based on the shape of an object or the like; therefore, the authenticity of the identification result must be high.

In consideration of the above facts, a weight of 0.2 is set for the radar confidence inputted from the radar 1 and a weight of 0.8 is set for the camera confidence inputted from the camera 2, so that the weighted average of the respective confidences is obtained as represented in FIG. 5. As represented in FIG. 5, the weighted average of confidence for the category "automobile" is 0.024, the weighted average of confidence for the category "motorcycle" is 0.404, and the weighted average of confidence for the category "pedestrian" is 0.572; thus, the detected object is identified as a "pedestrian", the weighted average of confidence for which is the largest.

As described above, in Embodiment 1, the respective weights for the radar and the camera are set and then the weighted average of the radar confidence and the camera confidence for each category is calculated as the average confidence for each category, so that the category having the highest average confidence is identified as the kind of the object.

In Embodiment 1, the CPU 3 is formed separately from the radar 1 and the camera 2; however, for example, even when the CPU 3 is integrated in the camera 2, entirely the same effect can be demonstrated.

In Embodiment 1, there has been described an example in which identification of an object is implemented by utilizing two sensors, i.e., the radar 1 and the camera 2; however, it goes without saying that more accurate identification can be implemented by adding the result of identification (confidence) by further another sensor (e.g., a laser distance meter) to the results of identifications by the radar 1 and the camera 2.

In Embodiment 1, the identification is implemented by integrating the results of determinations by a plurality of sensors, without definitely determining that an object is not a pedestrian based only on the result of identification by a given sensor (e.g., the radar 1); therefore, accurate identification can be implemented. Moreover, as the confidence for each category to be calculated by a sensor, a weighted average is utilized; therefore, it is made possible to perform a more accurate identification in which the object identification aptitude of a sensor is taken into consideration.

The present invention is useful, for example, for an object identification device that is mounted in an automobile or the like, detects an object existing ahead, and identifies the kind of the object.

It should be noted that the present invention is not limited to the above embodiment, and the embodiment of the present invention may appropriately modified or omitted within the spirit and scope of the present invention.

What is claimed is:

1. An object identification device comprising:
    a plurality of sensors, each of which:
        detects an object, and
        for each of a plurality of categories, determines and outputs a confidence indicating a degree of matching with a respective one from among the plurality of categories for the detected object; and
    a processor that calculates an average confidence for each of the plurality of categories by weighted-averaging confidences output by the sensors, wherein the weighted-averaging comprises assigning different weights to at least two sensors from among the plurality of sensors for the same category from among the plurality of categories; and identifies a category from among the plurality of categories having a highest weighted-average confidence and categorizes the detected object into the identified category.

2. The object identification device according to claim 1, wherein each of the plurality of sensors normalizes the confidence for each of the plurality of categories such that a summation of the confidence from the plurality of categories is equal to 1.

3. The object identification device according to claim 2, wherein the plurality of sensors comprise a radar, which outputs the confidence to the processor, for each of the plurality of categories, and wherein the radar calculates the confidence from a reception level of an electric wave reflected on the object and received by the radar and a distance to the object.

4. The object identification device according to claim 2, wherein the plurality of sensors comprise a camera, which outputs the confidence to the processor for each of the plurality of categories, and wherein the camera obtains the confidence based on a degree of matching with each of the plurality of categories, which is calculated by implementing a pattern matching between an image captured by the camera and the object in each of the plurality of categories.

5. The object identification device according to claim 1, wherein the plurality of sensors comprise a radar, which outputs the confidence to the processor, for each of the plurality of categories, and wherein the radar calculates the confidence from a reception level of an electric wave reflected from the object and received by the radar and a distance to the object.

6. The object identification device according to claim 1, wherein the plurality of sensors comprise a camera, which outputs the confidence to the processor for each of the plurality of categories, and wherein the camera obtains the confidence based on a degree of matching with each of the plurality of categories, which is calculated by implementing a pattern matching between an image captured by the camera and the object in each of the plurality of categories.

7. The object identification device according to claim 1, wherein:
    the plurality of categories comprises a pedestrian category, a motorcycle category, and a vehicle category, and
    the processor normalizes the calculated average confidence for each of the plurality of categories such that a summation of the calculated average confidence for the plurality of categories is equal to 1 and in response to the object being in the pedestrian category, identify the object is a pedestrian ahead of a vehicle.

8. The object identification device according to claim 1, wherein the processor applies pre-set weights to the calculated average confidence based on an authenticity of a respective sensor from among the plurality of sensors.

9. An object identification apparatus mounted in a vehicle comprising:
    at least one camera which captures an image of an object in front of a vehicle and executes pattern matching of the captured image with respect to each of a plurality of categories to obtain a respective camera confidence value for each of the plurality of categories, and normalizes the obtained respective camera confidence value for each of the plurality of categories;
    a radar which transmits a pulse to the object and receives an electric wave reflected by the object, calculates a respective radar confidence value for each of the plurality of categories, and normalizes the calculated respective radar confidence value for each of the plurality of categories; and
    a processor, which weight-averages confidence for each of the plurality of categories using the respective camera confidence value output from the camera and the respective radar confidence value output from the radar and determines a category with a highest weight-average confidence as the category of the object from among the plurality of categories,
    wherein the weight-average comprises assigning different weights to the respective radar confidence value from the radar and the respective camera confidence value from the camera with respect to at least one of the plurality of categories.

10. The object identification apparatus according to claim 9, wherein the plurality of categories comprises a pedestrian category, a motorcycle category, and a vehicle category and wherein, in response to the object being determined to be in the pedestrian category, the processor identifies the object as a pedestrian ahead of the vehicle.

11. The object identification apparatus according to claim 10, wherein different weights are set to each of the radar and the camera based on an authenticity of a respective device.

12. An object identification method comprising:
    detecting an object by each of a plurality of sensors, and
    determining and outputting by each of the plurality of sensors for each of a plurality of categories, a confidence indicating a degree of matching with a respective one from among the plurality of categories for the detected object; and
    calculating, by a processor, an average confidence for each of the plurality of categories by weighted-averaging confidences output by the sensors, wherein the weighted-averaging comprises assigning different weights to at least two sensors from among the plurality of sensors in the same category, from among the plurality of categories;
identifying, by the processor a category having a highest weighted-average confidence; and
categorizing, by the processor, the detected object into the identified category.

\* \* \* \* \*